(12) United States Patent
Reed et al.

(10) Patent No.: US 6,490,110 B2
(45) Date of Patent: Dec. 3, 2002

(54) SERVO DATA DETECTION WITH IMPROVED PHASE SHIFT TOLERANCE

(75) Inventors: David E. Reed, Westminster, CO (US); Stephen A. Turk, Longmont, CO (US); Li Du, Broomfield, CO (US)

(73) Assignee: Cirrus Logic, Inc., Austin, TX (US)

( * ) Notice: Subject to any disclaimer, the term of this patent is extended or adjusted under 35 U.S.C. 154(b) by 22 days.

(21) Appl. No.: 09/740,748

(22) Filed: Dec. 19, 2000

(65) Prior Publication Data

US 2002/0114100 A1 Aug. 22, 2002

Related U.S. Application Data

(63) Continuation of application No. 09/730,091, filed on Dec. 5, 2000.

(51) Int. Cl.$^7$ .............................. G11B 5/09; G11B 5/596
(52) U.S. Cl. ..................... 360/48; 360/53; 360/77.08
(58) Field of Search ........................... 360/77.04, 70.07, 360/77.08, 77.11, 78.04, 49, 48, 53; 714/54, 795, 796

(56) References Cited

U.S. PATENT DOCUMENTS 6,005,727 A   12/1999   Behrens et al.
6,345,074 B1 * 2/2002   Turk et al. ............... 360/77.08

* cited by examiner

Primary Examiner—Regina N. Holder

(57) ABSTRACT

Servo circuitry is disclosed that is configured to operate with a magnetic disk drive system. The servo circuitry is comprised of a first servo detector system, a second servo detector system, and a comparator. The first servo detector system and the second servo detector system each receive samples, taken from a read signal, that include servo data. The first servo detector system compares the samples to a plurality of servo codes to generate a first selected code. The second servo detector system compares a first shifted version of the samples to the plurality of servo codes to generate a second selected code. The comparator receives the selected codes and selects one of the selected codes. The selected code represents the servo data. The servo circuitry could also include a third servo detector system that operates on a second shifted version of the samples. Alternatively, the first servo detector system, the second servo detector system, and the third servo detector system could each be programmed with different servo codes. The first servo detector system compares the samples to a plurality of first servo codes. The second servo detector system compares the samples to a plurality of second servo codes. The third servo detector system compares the samples to a plurality of third servo codes. The second servo codes and the third servo codes are shifted versions of the first servo codes. In either embodiment, the servo circuitry advantageously has improved phase shift tolerance.

38 Claims, 7 Drawing Sheets

SERVO DATA DETECTION WITH IMPROVED PHASE SHIFT TOLERANCE

RELATED APPLICATIONS

This application is a continuation of U.S. patent application Ser. No. 09/730,091 filed on Dec. 5, 2000 entitled "Servo Data Detection With Improved Phase Shift Tolerance," which is hereby incorporated herein by reference.

BACKGROUND OF THE INVENTION

1. Field of the Invention

The invention is related to the field of disk drive systems, and in particular, to servo data detection with improved phase shift tolerance.

2. Statement of the Problem

Disk drive systems store data on magnetic storage media such as a magnetic disk. The magnetic disk contains a series of circular tracks that span the surface of the disk. User data and servo data are encoded and written on the tracks of the disk, and are represented by magnetic transitions on the disk. The disk drive system uses the servo data to locate the user data.

The servo data is written in servo sectors at periodic locations on the tracks. The servo data includes sector number, track number, head number, and index bits. The user data is written between the servo sectors. When a read head from the disk drive system passes over one of the tracks, the read head generates a read signal. The disk drive system transfers the read signal to read channel circuitry. The read channel circuitry includes servo circuitry. The servo circuitry processes the read signal to detect the servo data. The servo circuitry uses the servo data to position the read head over the center of a track when the disk drive system is in a track following mode. The servo circuitry also uses the servo data to position the read head over a new track when the disk drive system is in seek mode.

Current servo circuitry is comprised of a matched filter system and a comparator. The matched filter system is comprised of eight matched filters. Each matched filter is programmed with a sixteen-bit Error Correcting Grey Code (ECGC). The matched filters receive samples taken from the read signal. The matched filters compare blocks of the samples to the sixteen-bit codes to generate weighted values. The comparator receives the eight weighted values and selects the highest weighted value. The comparator outputs a three-bit code based on which weighted value was selected. The three-bit code represents a translation of the sixteen-bit code that most closely matched the sample block passed to the matched filters. Thus, the servo circuitry selects the most likely three-bit code represented by the samples.

Occasionally a phase shift of the servo data occurs when the servo data is written to the disk. The magnetic transitions that represent the servo data ideally start at specific locations on the disk. Phase shifts occur when the magnetic transitions start before or after the specific locations. Phase shifts on successive tracks on the disk are sometimes referred to as "shingling". The phase shifts can be inconsequential or could be up to, or exceeding, one bit. A one-bit phase shift could cause the servo circuitry to detect an incorrect code from the samples. For example, suppose the servo data written on the disk starts with the bit pattern "1 0 1 1 0 1". A one-bit forward phase shift in the servo data could cause the samples to represent the same bit pattern as "x 1 0 1 1 0". A one-bit backward phase shift in the servo data could cause the samples to represent the same bit pattern as "0 1 1 0 1 x". Unfortunately, the servo circuitry may not detect an appropriate match to the ECGCs when the above phase shifts occur causing the servo circuitry to output incorrect servo data. Therefore, the servo circuitry described above is susceptible to errors due to phase shifts in the servo data.

SUMMARY OF THE SOLUTION

The invention helps to solve the above problems with servo circuitry that is substantially intolerant to phase shifts. The servo circuitry can detect servo data even when the servo data has phase shifted. The servo circuitry advantageously provides a disk drive system that is more reliable and has improved performance, especially during a seek operation.

In one aspect of the invention, the servo circuitry is comprised of a first servo detector system, a second servo detector system, and a first comparator. The first servo detector system receives samples taken from a read signal. The samples include servo data. The first servo detector system performs a first comparison by comparing the samples to a plurality of servo codes. The first servo detector system selects a first one of the plurality of servo codes based on the first comparison. The first servo detector system then indicates the first one of the plurality of servo codes as a first selected code. The first servo detector system transfers the first selected code to the first comparator.

The second servo detector system also receives the samples. The second servo detector system performs a second comparison by comparing a first shifted version of the samples to the plurality of servo codes. The second servo detector system could generate the first shifted version by shifting the samples by one bit. The second servo detector system selects a second one of the plurality of servo codes based on the second comparison. The second servo detector system then indicates the second one of the plurality of servo codes as a second selected code. The second servo detector system transfers the second selected code to the first comparator.

The first comparator receives the selected codes and performs a third comparison of the selected codes. The first comparator selects one of the selected codes based on the third comparison. The one of the selected codes represents the servo data.

In some examples, the servo circuitry further comprises a third servo detector system. The third servo detector also receives the samples. The third servo detector system performs a fourth comparison by comparing a second shifted version of the samples to the plurality of servo codes. The third servo detector system could generate the second shifted version by shifting the samples by two bits. The third servo detector system selects a third one of the plurality of servo codes based on the fourth comparison. The third servo detector system then indicates the third one of the plurality of servo codes as a third selected code. The third servo detector system transfers the third selected code to the first comparator. The first comparator includes the third selected code in the third comparison.

In another aspect of the invention, the servo circuitry is again comprised of the first servo detector system, the second servo detector system, and the first comparator. In this example, the first servo detector system performs the first comparison by comparing the samples to a plurality of first servo codes. The first servo detector system selects one of the plurality of first servo codes based on the first comparison. The first servo detector system then indicates the one of the plurality of first servo codes as the first selected code. The first servo detector system transfers the first selected code to the first comparator.

The second servo detector system performs the second comparison by comparing the samples to a plurality of second servo codes. The second servo codes could be same as the first servo codes shifted by one bit. The second servo detector system selects one of the plurality of second servo codes based on the second comparison. The second servo detector system then indicates the one of the plurality of second servo codes as the second selected code. The second servo detector system transfers the second selected code to the first comparator.

The first comparator receives the selected codes and performs the third comparison of the selected codes. The first comparator selects the one of the selected codes based on the third comparison. The one of the selected codes represents the servo data.

In some examples, the third servo detector performs the fourth comparison by comparing the samples to a plurality of third servo codes. The third servo codes could be same as the first servo codes shifted by two bits. The third servo detector system selects the one of the plurality of third servo codes based on the fourth comparison. The third servo detector system then indicates the one of the plurality of third servo codes as a third selected code. The third servo detector system transfers the third selected code to the first comparator. The first comparator includes the third selected code in the third comparison.

In another aspect of the invention, the first servo detector system is comprised of a first matched filter system and a second comparator. The second servo detector system is comprised of a second matched filter system and a third comparator. The third servo detector system is comprised of a third matched filter system and a fourth comparator. The matched filter systems can be programmed with 16-bit or 8-bit Error Correcting Grey Codes (ECGC).

DETAILED DESCRIPTION OF THE INVENTION

Figure 1:
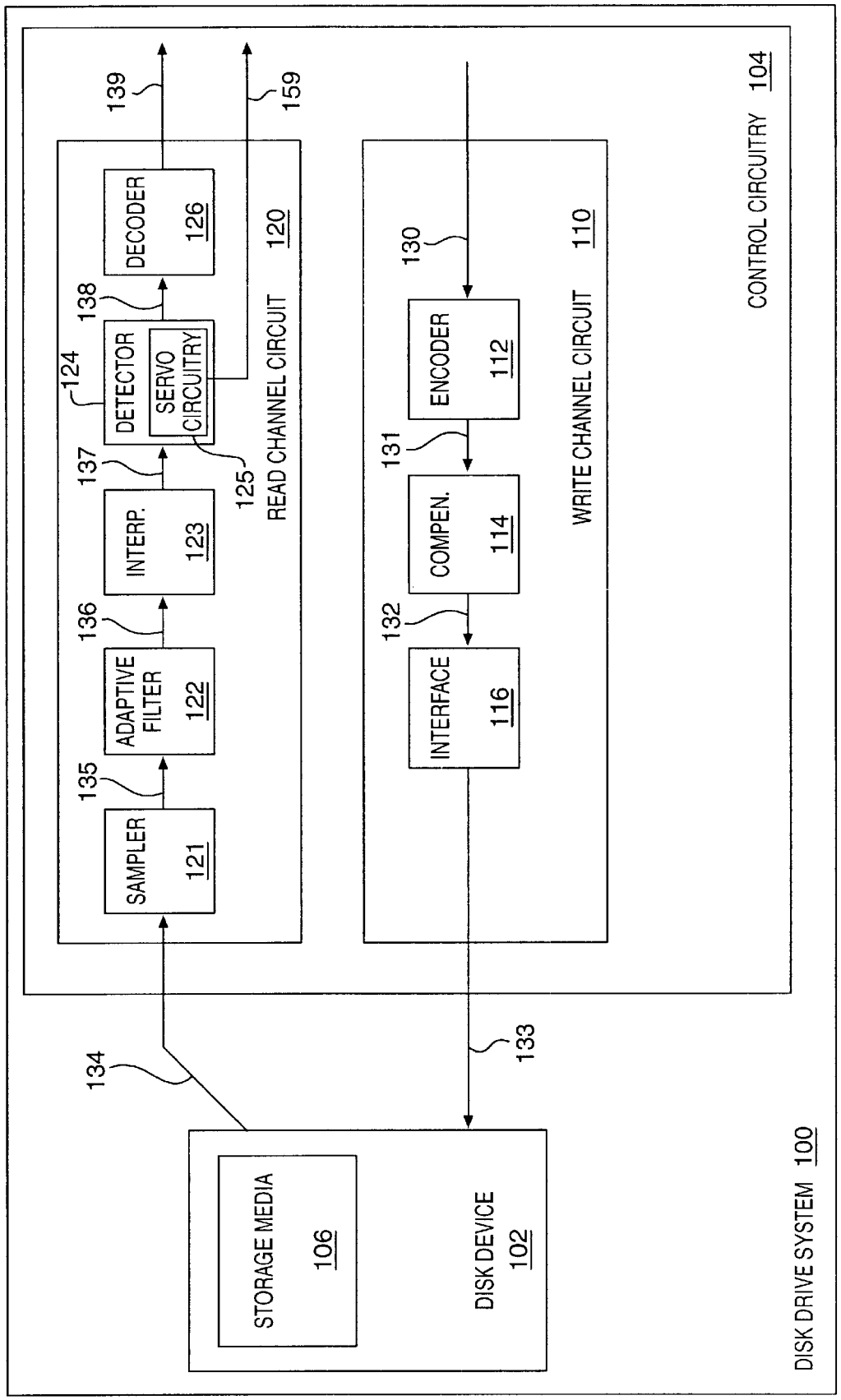
FIG. 1 is a block diagram that illustrates a disk drive system in the prior art.
Figure 2:
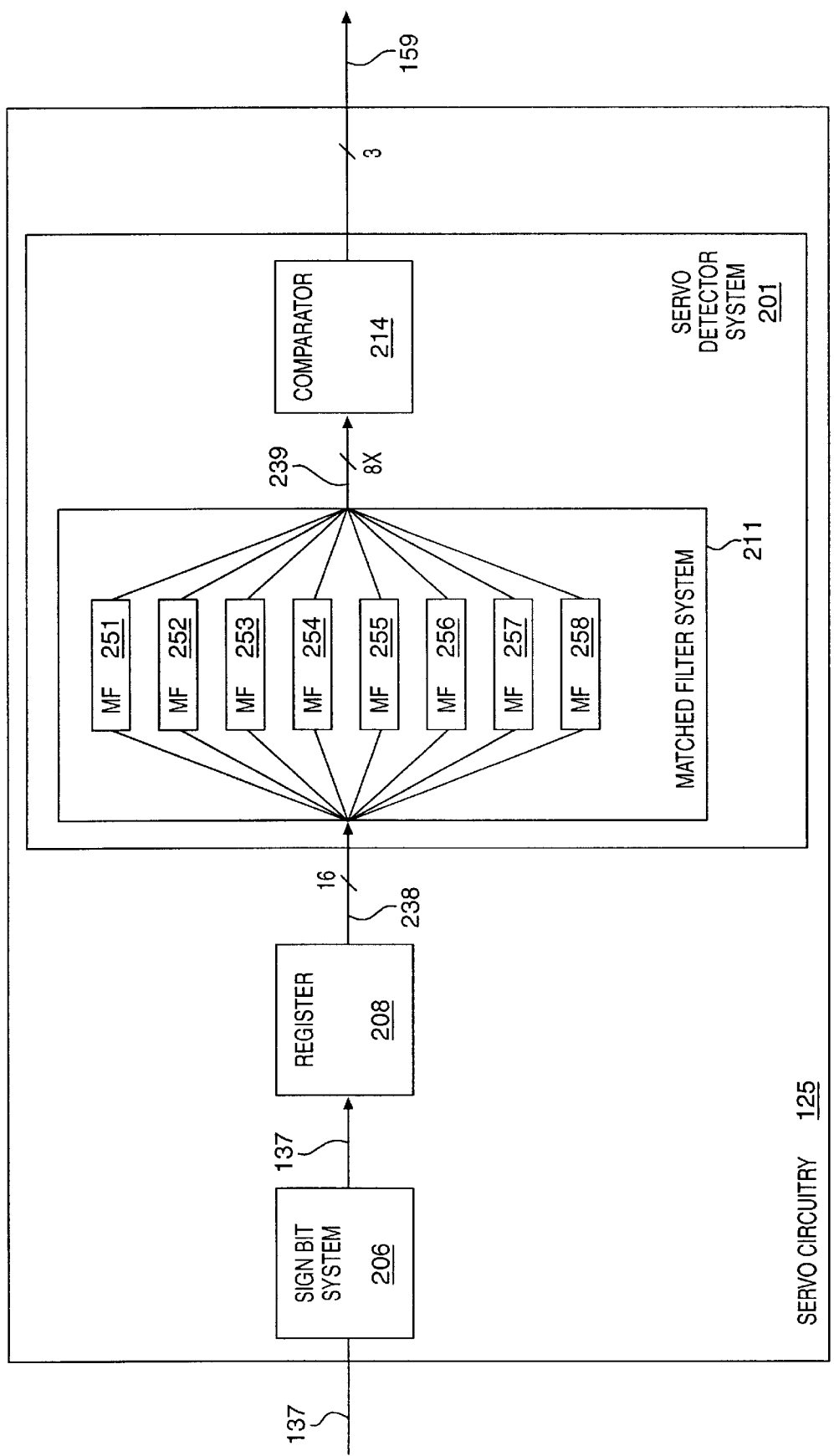
FIG. 2 is a block diagram that illustrates servo circuitry in the prior art.

Prior Art Disk Drive System—FIGS. 1–2

FIG. 1 shows an example of a disk drive system 100 in the prior art. Disk drive system 100 includes a disk device 102 and associated control circuitry 104. Disk device 102 includes storage media 106. Storage media 106 is comprised of magnetic disks. Control circuitry 104 includes write channel 110 and read channel 120. Write channel 110 includes encoder 112, compensation 114, and write interface 116 connected in series. Read channel 120 includes sampler 121, adaptive filter 122, interpolator 123, detector 124, and decoder 126 connected in series. Detector 124 includes servo circuitry 125. Interface 116 and sampler 121 communicate with disk device 102.

Data signal 130 carries user data. Write channel 110 receives data signal 130 and transfers a corresponding write signal 133 to disk device 102. Disk device 102 stores the user data on storage media 106. Subsequently, disk device 102 reads storage media 106 and transfers a corresponding read signal 134 to read channel 120. Write signal 133 and read signal 134 should both represent the user data. Read channel 120 processes read signal 134 to generate data signal 139. Ideally, data signal 139 carries the same user data as data signal 130.

Write channel 110 operates as follows. Encoder 112 receives and encodes data signal 130 to generate encoded signal 131. The encoding provides error-checking capability when the data is subsequently decoded. Encoder 112 transfers the encoded signal 131 to compensation 114. Compensation 114 adjusts the timing of transitions in the encoded signal 131 to generate time-adjusted signal 132. Compensation 114 transfers the time-adjusted signal 132 to interface 116. Interface 116 converts the time-adjusted signal 132 from digital format to analog format to generate the write signal 133. Interface 116 transfers the write signal 133 to disk device 102.

Write signal 133 drives a magnetic head that alters a magnetic field to create magnetic transitions on the magnetic disk. These magnetic transitions should represent the user data and servo data. The magnetic head subsequently detects the magnetic transitions to generate read signal 134.

The positioning of heads relative to the disk is essential for proper system operation. The servo data is stored on the disk to facilitate this positioning. Read signal 134 includes this servo data. The control circuitry 104 processes the servo data from read signal 134 to control the location of the heads relative to the disk.

Read channel 120 operates as follows. Sampler 121 receives and samples the read signal 134 to generate read samples 135. Sampler 121 transfers the read samples 135 to adaptive filter 122. Adaptive filter 122 removes distortion by shaping the read samples 135 to generate equalized samples 136. Adaptive filter 122 transfers the equalized samples 136 to interpolator 123. Interpolator 123 synchronizes the equalized samples 136 with the clock for detector 124 to generate interpolated samples 137. Interpolator 123 transfers the interpolated samples 137 to detector 124. Detector 124 uses a detection algorithm, such as a Viterbi state machine, to convert the interpolated samples 137 into an encoded signal 138 that represents the user data. Detector 124 transfers the encoded signal 138 to decoder 126. Detector 124 also detects the servo data from the interpolated samples 137 using servo circuitry 125. The servo circuitry 125 generates and transfers a servo signal 159 that represents the servo data. Decoder 126 decodes the encoded signal 138 into data signal 139 by applying a decoding technique, such as PR4 with D=0 constraints. Decoder 126 also performs error-checking functions. Data signal 139 should represent the user data.

FIG. 2 shows an example of servo circuitry 125 in the prior art. The servo circuitry 125 is comprised of servo detector system 201, sign bit system 206, and register 208. Servo detector system 201 is comprised of matched filter system 211 and comparator 214. Matched filter system 211 comprises matched filters 251–258.

In operation, sign bit system 206 receives the interpolated samples 137 from the interpolator 123. Sign bit system 206 is configured to change the polarity of the servo circuitry 125 to match the polarity of the interpolated samples 137. Sign bit system 206 transfers the interpolated samples 137 to register 208. Register 208 receives and buffers the interpolated samples 137 to generate a sample block 238. Register 208 is a sixteen-sample register. Register 208 transfers the sample block 238 to matched filter system 211.

Matched filters 251–258 receive the sample block 238. Matched filters 251–258 are programmed with sixteen-bit Error Correcting Grey Code (ECGC) servo codes. Matched filters 251–258 compare the sample block 238 to the servo codes. Matched filters 251–258 generate weighted values 239. The weighted values 239 represent how closely the servo codes programmed into matched filters 251–258 match the sample block 238. The operation of matched filters is well known in the art. Matched filters 251–258 transfer the weighted values 239 to comparator 214. Comparator 214 compares the weighted values 239 for the sample block 238 to determine which matched filter 251–258 generated the highest weighted value. Comparator 214 selects the servo code from the matched filter 251–258 that generates the highest weighted value for the sample block 238. Comparator 214 generates a three-bit code that represents a translation of the selected servo code. The three-bit code is represented in FIG. 2 as servo signal 159. Servo signal 159 should represent the servo data.

Figure 3:
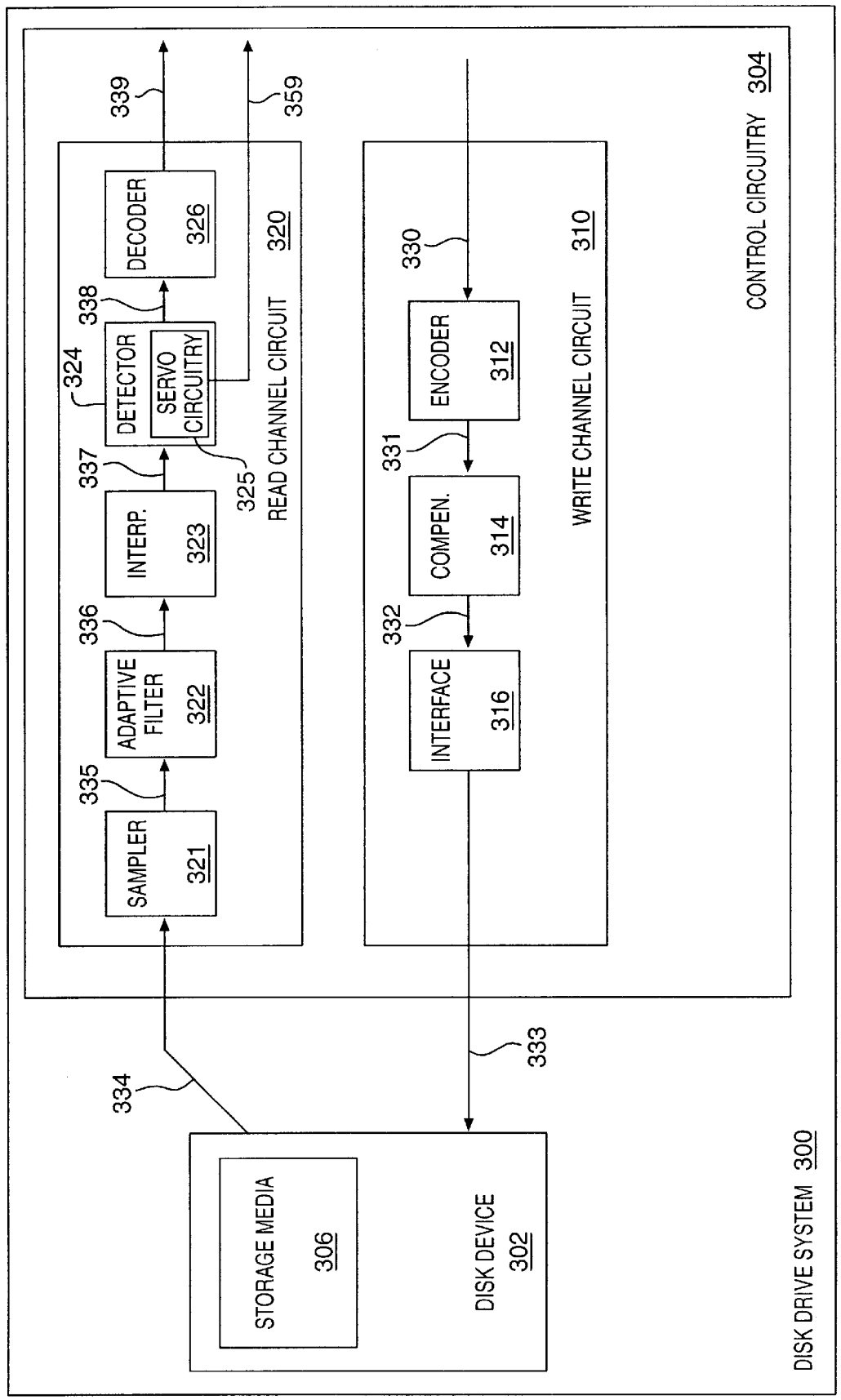
FIG. 3 is a block diagram that illustrates a disk drive system in an example of the invention.

Disk Drive System Configuration and Operation—FIG. 3

FIG. 3 depicts an example of a disk drive system in accord with the present invention. Those skilled in the art will appreciate numerous variations from this example that do not depart from the scope of the invention. Those skilled in the art will also appreciate that various features could be combined to form multiple variations of the invention. Those skilled in the art will appreciate that some conventional aspects of the disk drive system have been simplified or omitted for clarity.

FIG. 3 shows disk drive system 300 that includes disk device 302 and associated control circuitry 304. Disk device 302 includes storage media 306 that is made of magnetic material. Control circuitry 304 includes write channel 310 and read channel 320. Write channel 310 includes encoder 312, compensation 314, and write interface 316 connected in series. Read channel 320 includes sampler 321, adaptive filter 322, interpolator 323, detector 324, and decoder 326 connected in series. Detector 324 includes servo circuitry 325. Interface 316 and sampler 321 are coupled to disk device 302.

Data signal 330 carries user data. Write channel 310 receives data signal 330 and transfers a corresponding write signal 333 to disk device 302. Disk device 302 stores the user data on storage media 306. Subsequently, disk device 302 reads storage media 306 and transfers a corresponding read signal 334 to read channel 320. Write signal 333 and read signal 334 should both represent the user data. Read channel 320 processes read signal 334 to generate data signal 339. Ideally, data signal 339 carries the same user data as data signal 330.

Write channel 310 operates as follows. Encoder 312 receives and encodes data signal 330 to generate encoded signal 331. Encoder 312 transfers the encoded signal 331 to compensation 314. Compensation 314 adjusts the timing of transitions in the encoded signal 331 to generate time-adjusted signal 332. Compensation 314 transfers the time-adjusted signal 332 to interface 316. Interface 316 converts the time-adjusted signal 332 from digital format to analog format to generate write signal 333. Interface 316 transfers the write signal 333 to disk device 302.

Read channel 320 operates as follows. Sampler 321 receives and samples read signal 334 to generate read samples 335. Sampler 321 transfers the read samples 335 to adaptive filter 322. Adaptive filter 322 removes distortion by shaping the read samples 335 to generate equalized samples 336. Adaptive filter 322 transfers the equalized samples 336 to interpolator 323. Interpolator 323 synchronizes the equalized samples 336 with the clock for detector 324 to generate interpolated samples 337. Interpolator 323 transfers the interpolated samples 337 to detector 324. Detector 324 uses a detection algorithm to convert the interpolated samples 337 into an encoded signal 338 that represents the user data. Detector 324 transfers the encoded signal 338 to decoder 326. Detector 324 also detects servo data from the interpolated samples 337 using servo circuitry 325. The servo circuitry 325 generates and transfers a servo signal 359 that represents the servo data. The operation of servo circuitry 325 is discussed further with regard to FIG. 4. Decoder 326 decodes the encoded signal 338 into data signal 339 by applying a decoding technique. Decoder 326 also performs error-checking functions. Data signal 339 should represent the user data.

Figure 4:
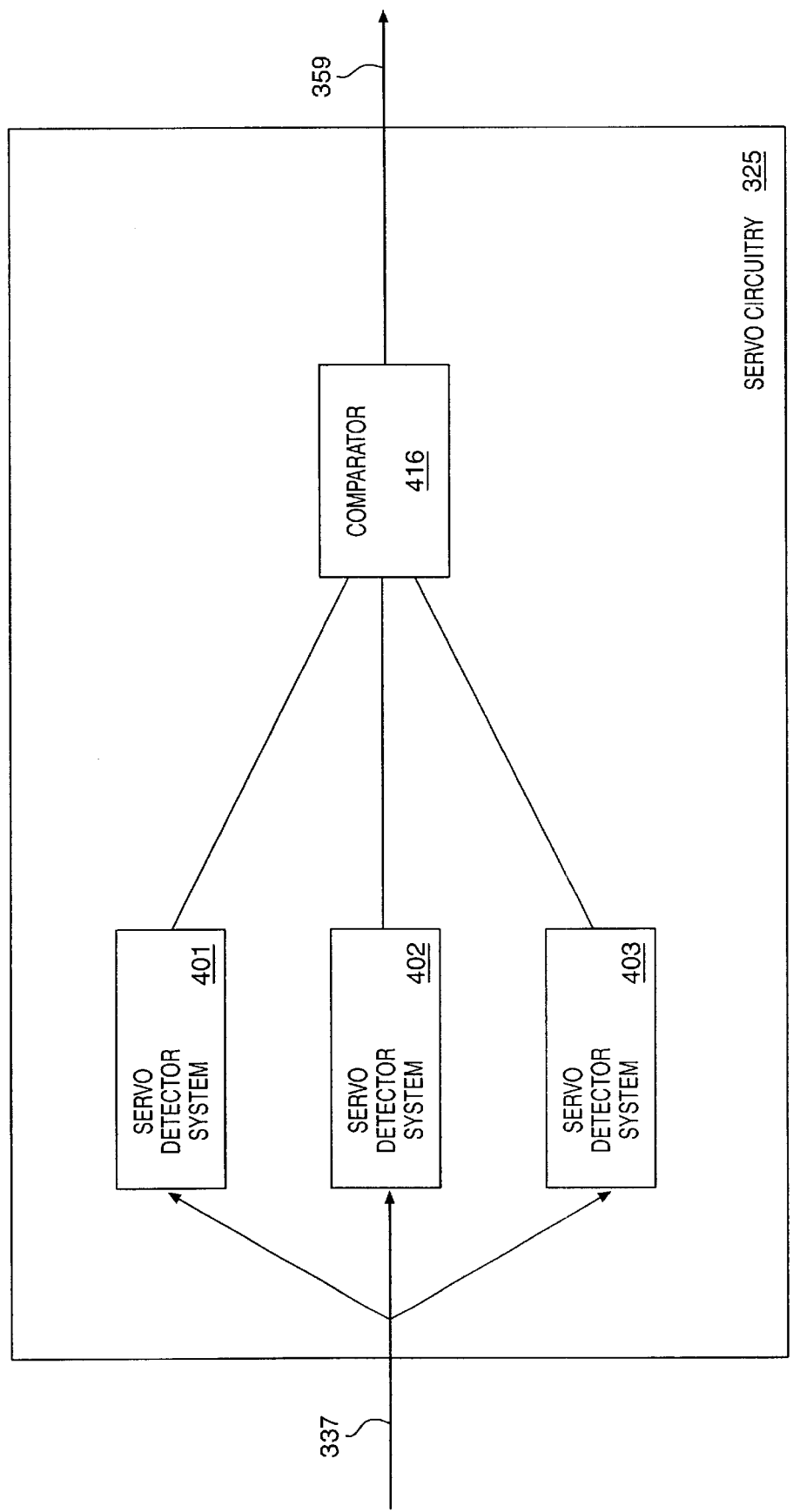
FIG. 4 is a block diagram that illustrates servo circuitry in an example of the invention.

Servo Circuitry Using Multiple Servo Detector Systems—FIG. 4

FIG. 4 depicts specific examples of servo circuitry in accord with the present invention. Those skilled in the art will appreciate numerous variations from these examples that do not depart from the scope of the invention. Those skilled in the art will also appreciate that various features described could be combined with other embodiments to form multiple variations of the invention. Those skilled in the art will appreciate that some conventional aspects of the servo circuitry have been simplified or omitted for clarity.

FIG. 4 shows a block diagram that illustrates an example of servo circuitry 325. Servo circuitry 325 is comprised of servo detector system 401, servo detector system 402, servo detector system 403, and comparator 416. Comparator 416 is coupled to servo detector system 401, servo detector system 402, and servo detector system 403.

In a first example of the operation of servo circuitry 325, servo detector system 401 receives the interpolated samples 337. The interpolated samples 337 include servo data. Servo detector system 401 performs a first comparison by comparing the interpolated samples 337 to a plurality of servo codes. Servo detector system 401 selects a first one of the plurality of servo codes based on the first comparison. Servo detector system 401 then indicates the first one of the plurality of servo codes as a first selected code. Servo detector system 401 transfers the first selected code to comparator 416.

Servo detector system 402 also receives the interpolated samples 337. Servo detector system 402 performs a second comparison by comparing a first shifted version of the interpolated samples 337 to the plurality of servo codes. Servo detector system 402 selects a second one of the plurality of servo codes based on the second comparison. Servo detector system 402 then indicates the second one of the plurality of servo codes as a second selected code. Servo detector system 402 transfers the second selected code to comparator 416.

Comparator 416 receives the selected codes from servo detector systems 401–402. Comparator 416 performs a third comparison of the selected codes. Comparator 416 selects one of the selected codes based on the third comparison. Comparator 416 transfers the one of the selected codes. The one of the selected codes represents the servo data and is represented in FIG. 4 as signal 359.

In some examples, servo detector system 403 also receives the interpolated samples 337. Servo detector system 403 performs a fourth comparison by comparing the second shifted version of the interpolated samples 337 to the plurality of servo codes. Servo detector system 403 selects a third one of the plurality of servo codes based on the fourth comparison. Servo detector system 403 then indicates the third one of the plurality of servo codes as a third selected code. Servo detector system 403 transfers third selected code to comparator 416. Comparator 416 includes the third selected code in the third comparison.

In a second example of the operation of servo circuitry 325, servo detector system 401 receives the interpolated samples 337. Servo detector system 401 performs the first comparison by comparing the interpolated samples 337 to a plurality of first servo codes. Servo detector system 401 selects one of the plurality of first servo codes based on the first comparison. Servo detector system 401 then indicates the one of the plurality of first servo codes as the first selected code. Servo detector system 401 transfers the first selected code to comparator 416.

Servo detector system 402 also receives the interpolated samples 337. Servo detector system 402 performs the second comparison by comparing the interpolated samples 337 to a plurality of second servo codes. The plurality of second servo codes could be a shifted version of the first servo codes. Servo detector system 402 selects one of the plurality of second servo codes based on the second comparison. Servo detector system 402 then indicates the one of the plurality of second servo codes as the second selected code. Servo detector system 402 transfers the second selected code to comparator 416.

Comparator 416 receives the selected codes from servo detector systems 401–402. Comparator 416 performs the third comparison of the selected codes. Comparator 416 selects one of the selected codes based on the third comparison. Comparator 416 transfers the one of the selected codes. The one of the selected codes represents the servo data and is represented in FIG. 4 as signal 359.

In some examples, servo detector system 403 also receives the interpolated samples 337. Servo detector system 403 performs the fourth comparison by comparing the interpolated samples 337 to a plurality of third servo codes. The plurality of third servo codes could be a shifted version of the first servo codes and the second servo codes. Servo detector system 403 selects one of the plurality of third servo codes based on the fourth comparison. Servo detector system 403 then indicates the one of the plurality of third servo codes as the third selected code. Servo detector system 403 transfers third selected code to comparator 416. Comparator 416 includes the third selected code in the third comparison.

Figure 5:
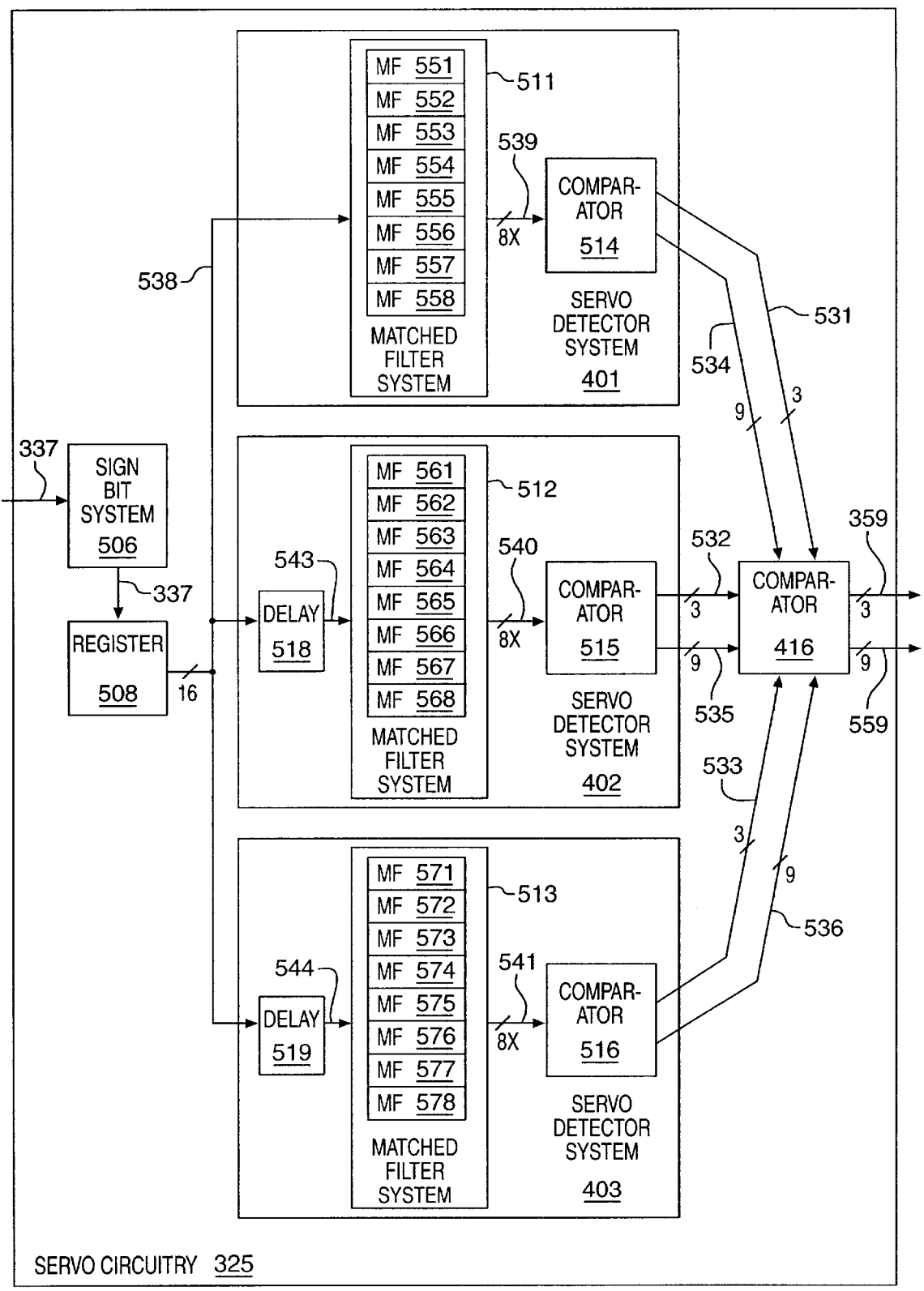
FIG. 5 is a block diagram that illustrates servo circuitry using sixteen-bit matched filters in an example of the invention.

Servo Circuitry Using Sixteen-bit Matched Filters—FIG. 5

FIG. 5 depicts an example of servo circuitry in accord with the present invention. Those skilled in the art will appreciate numerous variations from this example that do not depart from the scope of the invention. Those skilled in the art will also appreciate that various features described could be combined with other embodiments to form multiple variations of the invention. Those skilled in the art will appreciate that some conventional aspects of the servo circuitry have been simplified or omitted for clarity.

FIG. 5 shows a block diagram illustrating an example of servo circuitry 325. Servo circuitry 325 comprises sign bit system 506, register 508, servo detector system 401, servo detector system 402, servo detector system 403, and comparator 416. Servo detector system 401 is comprised of matched filter system 511 and comparator 514. Servo detector system 402 is comprised of delay 518, matched filter system 512, and comparator 515. Servo detector system 403 is comprised of delay 519, matched filter system 513, and comparator 516. Matched filter system 511 comprises matched filters 551–558. Matched filter system 512 comprises matched filters 561–568. Matched filter system 513 comprises matched filters 571–578.

Sign bit system 506 is coupled to register 508. Register 508 is coupled to matched filter system 511, delay 518, and delay 519. Matched filter system 511 is coupled to comparator 514. Comparator 514 is coupled to comparator 416. Delay 518 is coupled to matched filter system 512. Matched filter system 512 is coupled to comparator 515. Comparator 515 is coupled to comparator 416. Delay 519 is coupled to matched filter system 513. Matched filter system 513 is coupled to comparator 516. Comparator 516 is coupled to comparator 416.

Register 508 is a sixteen-sample register. Matched filters 551–558, 561–568, and 571–578 are sixteen-bit filters. Matched filters 561–568 and 571–578 could be the same filters as matched filters 551–558. In other words, matched filters 551–558, matched filters 561–568, and matched filters 571–578 are programmed with the same coefficients.

In operation, sign bit system 506 receives the interpolated samples 337 from the interpolator 323. Sign bit system 506 is configured to change the polarity of the servo circuitry 325 to match the polarity of the interpolated samples 337 or vice-versa. Sign bit system 506 transfers the interpolated samples 337 to register 508. Register 508 receives and buffers the interpolated samples 337 to generate a sample block 538. Register 508 transfers the sample block 538 to servo detector systems 401–403.

Matched filter system 511 receives the sample block 538. Matched filters 551–558, within matched filter system 511, compare the sample block 538 to Error Correcting Grey Codes (ECGC) servo codes. Each matched filter 551–558 is programmed with a sixteen-bit servo code. Matched filters 551–558 generate weighted values 539 based on the servo codes. The weighted values 539 represent how closely the servo codes programmed into matched filters 551–558 match the sample block 538. Matched filters 551–558 transfer the weighted values 539 to comparator 514. Comparator 514 processes the weighted values 539 to generate a selected code 531. Comparator 514 generates the selected code 531 based on which matched filter 551–558 generates the highest weighted value for the sample block 538. The selected code 531 is a three-bit code that represents a translation of the sixteen-bit servo code that is programmed into the matched filter 551–558 that generated the highest weighted value. Comparator 514 transfers the selected code 531 and the highest weighted value to comparator 416. The highest weighted value is represented in FIG. 5 as weighted value 534.

Delay 518 also receives the sample block 538. Delay 518 delays the sample block 538 by one sample, or one bit, and transfers delayed sample block 543 to matched filter system 512. Matched filters 561–568, within matched filter system 512, compare the delayed sample block 543 to the ECGC servo codes. Each matched filter 561–568 is programmed with a sixteen-bit servo code to match the servo codes programmed in matched filters 551–558. Matched filters 561–568 generate weighted values 540 based on the servo codes. The weighted values 540 represent how closely the servo codes programmed into matched filters 561–568 match the delayed sample block 543. Matched filters 561–568 transfer the weighted values 540 to comparator 515. Comparator 515 processes the weighted values 540 to generate a selected code 532. Comparator 515 generates the selected code 532 based on which matched filter 561568 generates the highest weighted value for the delayed sample block 543. The selected code 532 is a three-bit code that represents a translation of the sixteen-bit servo code that is programmed into the matched filter 561–568 that generated the highest weighted value. Comparator 515 transfers the selected code 532 and the highest weighted value to comparator 416. The highest weighted value is represented in FIG. 5 as weighted value 535.

Delay 519 also receives the sample block 538. Delay 519 delays the sample block 538 by two samples, or two bits, and transfers the delayed sample block 544 to matched filter system 513. Matched filters 571–578, within matched filter system 513, compare the delayed sample block 544 to the ECGC servo codes. Each matched filter 571–578 is programmed with a sixteen-bit servo code to match the servo codes programmed in matched filters 551–558 and 561–568. Matched filters 571–578 generate weighted values 541 based on the servo codes. The weighted values 541 represent how closely the servo codes programmed into matched filters 571–578 match the delayed sample block 544. Matched filters 571–578 transfer the weighted values 541 to comparator 516. Comparator 516 processes the weighted values 541 to generate a selected code 533. Comparator 516 generates the selected code 533 based on which matched filter 571–578 generates the highest weighted value for the delayed sample block 544. The selected code 533 is a three-bit code that represents a translation of the sixteen-bit servo code that is programmed into the matched filter 571–578 that generated the highest weighted value. Comparator 516 transfers the selected code 533 and the highest weighted value to comparator 416. The highest weighted value is represented in FIG. 5 as weighted value 536.

Comparator 416 receives the selected codes 531–533 and the weighted values 534–536. Comparator 416 selects one of the selected code 531–533 based on the highest of the weighted values 534–536. Comparator 416 transfers the one of the selected codes 531–533, referred to as a detected code. The detected code is shown in FIG. 5 as servo signal 359. Comparator 416 also transfers the highest of the weighted values 534–536 to channel quality circuitry so that the channel quality circuitry can monitor the performance of detector 324. The highest of the weighted values 534–536 is shown in FIG. 5 as weighted value 559.

Servo circuitry 325 could operate in two modes. For instance, in normal mode, servo circuitry 325 operates using only servo detector system 401. Then, disk drive system 300 could change servo circuitry 325 to operate in phase shift improvement mode. Servo circuitry 325 operates in phase shift improvement mode as described above using servo detector systems 401–403. Disk drive system 100 could control servo circuitry 325 using a phase shift improvement mode bit.

Figure 6:
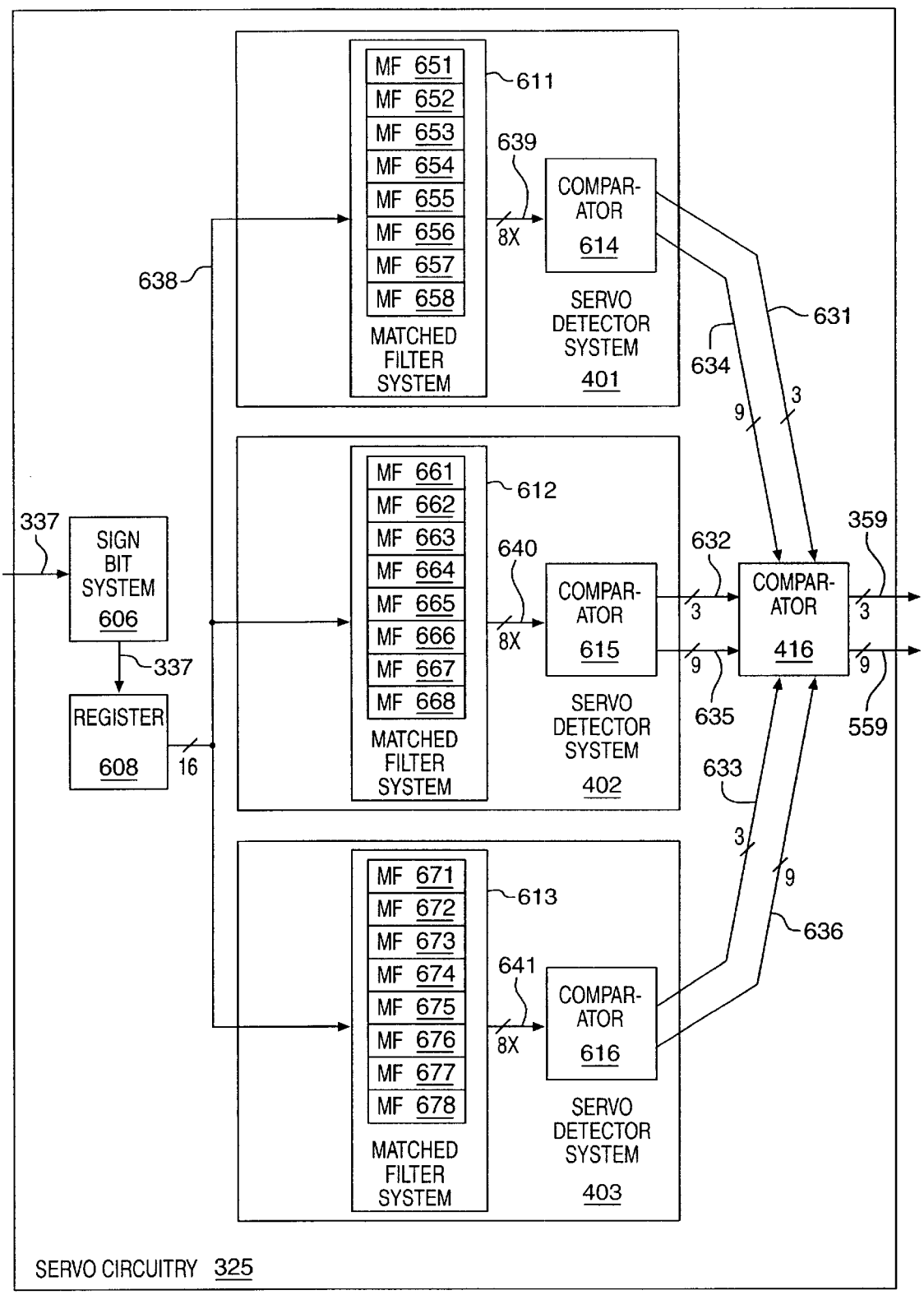
FIG. 6 is a block diagram that illustrates servo circuitry using matched filters with different coefficients in an example of the invention.

Servo Circuitry Using Matched Filters with Different Coefficients—FIG. 6

FIG. 6 depicts an example of servo circuitry in accord with the present invention. Those skilled in the art will appreciate numerous variations from this example that do not depart from the scope of the invention. Those skilled in the art will also appreciate that various features described could be combined with other embodiments to form multiple variations of the invention. Those skilled in the art will appreciate that some conventional aspects of the servo circuitry have been simplified or omitted for clarity.

FIG. 6 shows a block diagram illustrating an example of servo circuitry 325. Servo circuitry 325 comprises sign bit system 606, register 608, servo detector system 401, servo detector system 402, servo detector system 403, and comparator 416. Servo detector system 401 is comprised of matched filter system 611 and comparator 614. Servo detector system 402 is comprised of matched filter system 612 and comparator 615. Servo detector system 403 is comprised of matched filter system 613 and comparator 616. Matched filter system 611 comprises matched filters 651–658. Matched filter system 612 comprises matched filters 661–668. Matched filter system 613 comprises matched filters 671–678.

Sign bit system 606 is coupled to register 608. Register 608 is coupled to matched filter system 611, matched filter system 612, and matched filter system 613. Matched filter system 611 is coupled to comparator 614. Comparator 614 is coupled to comparator 416. Matched filter system 612 is coupled to comparator 615. Comparator 615 is coupled to comparator 416. Matched filter system 613 is coupled to comparator 616. Comparator 616 is coupled to comparator 416.

Register 608 is a sixteen-sample register. Matched filters 651–658, 661–668, and 671–678 are sixteen-bit filters. Matched filters 651–658, 661–668 and 671–678 are each programmed with different coefficients. Matched filters 651–658 are programmed with coefficients to match a first set of servo codes. Matched filters 661–668 are programmed with coefficients to match a second set of servo codes. The second set could be a one-bit shifted version of the first set. Matched filters 671–678 are programmed with coefficients to match a third set of servo codes. The third set could be a two-bit shifted version of the first set.

In operation, sign bit system 606 receives the interpolated samples 337 from the interpolator 323. Sign bit system 606 is configured to change the polarity of the servo circuitry 325 to match the polarity of the interpolated samples 337 or vice-versa. Sign bit system 606 transfers the interpolated samples 337 to register 608. Register 608 receives and buffers the interpolated samples 337 to generate a sample block 638. Register 608 transfers the sample block 638 to servo detector systems 401–403.

Matched filter system 611 receives the sample block 638. Matched filters 651–658, within matched filter system 611, compare the sample block 638 to the first set of servo codes. Matched filters 651–658 generate weighted values 639 based on the first set of servo codes. Comparator 614 processes the weighted values 639 to generate a selected code 631. Comparator 614 generates the selected code 631 based on which matched filter 651–658 generates the highest weighted value for the sample block 638. Comparator 614 transfers the selected code 631 and the highest weighted value to comparator 416. The highest weighted value is represented in FIG. 6 as weighted value 634.

Matched filter system 612 also receives the sample block 638. Matched filters 661–668 compare the sample block 638 to the second set of servo codes. Matched filters 661–668 generate weighted values 640 based on the second set of servo codes. Comparator 615 processes the weighted values 640 to generate a selected code 632. Comparator 615 generates the selected code 632 based on which matched filter 661–668 generates the highest weighted value for the sample block 638. Comparator 615 transfers the selected code 632 and the highest weighted value to comparator 416. The highest weighted value is represented in FIG. 6 as weighted value 635.

Matched filter system 613 also receives the sample block 638. Matched filters 671–678 compare the sample block 638 to the third set of servo codes. Matched filters 671–678 generate weighted values 641 based on the third set of servo codes. Comparator 616 processes the weighted values 641 to generate a selected code 633. Comparator 616 generates the selected code 633 based on which matched filter 671–678 generates the highest weighted value for the sample block 638. Comparator 616 transfers the selected code 633 and the highest weighted value to comparator 416. The highest weighted value is represented in FIG. 6 as weighted value 636.

Comparator 416 receives the selected codes 631–633 and the weighted values 634–636. Comparator 416 selects one of the selected code 631–633 based on the highest of the weighted values 634–636. Comparator 416 transfers the one of the selected codes, referred to as a detected code. The detected code is shown in FIG. 6 as servo signal 359. Comparator 416 also transfers the highest of the weighted values 634–636 to channel quality circuitry so that the channel quality circuitry can monitor the performance of detector 324. The highest of the weighted values 634–636 is shown in FIG. 6 as weighted value 659.

Figure 7:
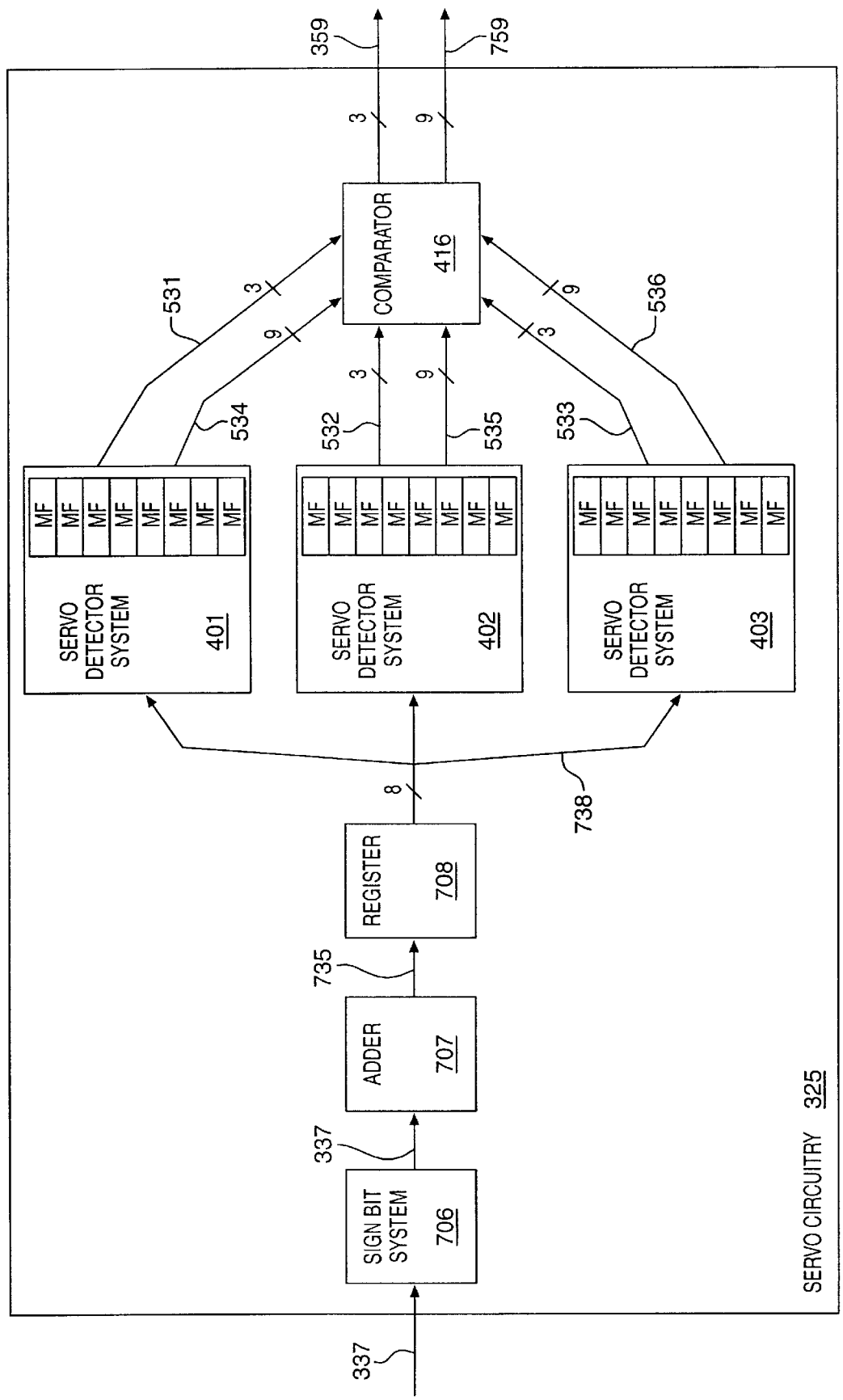
FIG. 7 is a block diagram that illustrates servo circuitry using eight-bit matched filters in an example of the invention.

Servo Circuitry Using Eight-bit Matched Filters—FIG. 7

FIG. 7 depicts an example of servo circuitry in accord with the present invention. Those skilled in the art will appreciate numerous variations from this example that do not depart from the scope of the invention. Those skilled in the art will also appreciate that various features described could be combined with other embodiments to form multiple variations of the invention. Those skilled in the art will appreciate that some conventional aspects of the servo circuitry have been simplified or omitted for clarity.

FIG. 7 shows a block diagram of an example of servo circuitry 325. Servo circuitry 325 is comprised of sign bit system 706, adder 707, register 708, servo detector system 401, servo detector system 402, servo detector system 403, and comparator 416. Sign bit system 706 is coupled to adder 707. Adder 707 is coupled to register 708. Register 708 is coupled to servo detector systems 401–403. Servo detector systems 401–403 are coupled to comparator 416.

Register 708 is an eight-sample register. Servo detector systems 401–403 operate as described above and shown in FIG. 6 or 7. One difference is that the matched filters in servo detector systems 401–403 in this example contain eight-bit ECGC servo codes instead of sixteen-bit servo codes.

In operation, sign bit system 706 receives the interpolated samples 337 from interpolator 323. Sign bit system 706 is configured to change the polarity of the servo circuitry 325 to match the polarity of the interpolated samples 337. Sign bit system 706 transfers the interpolated samples 337 to adder 707. Adder 707 adds pairs of the interpolated samples 337. Because all transitions in ECGC are in the same interleave, the interpolated samples 337 from each interleave can be added without losing any of the servo data. Adder 707 transfers the added samples 735 to register 708. Register 708 receives and buffers the added samples 735. Register 708 transfers a sample block 738 to servo detector system 401, servo detector system 402, and servo detector system 403.

Servo detector systems 401–403 and comparator 416 operate on the sample block 738 substantially as described above. Matched filters within servo detector systems 401–403 compare eight-bit servo codes to the sample block 738. The matched filters each generate and transfer a weighted value that represents how closely each servo code matched the sample block 738. Servo detector systems 401–403 transfer selected codes 531–533 and weighted values 534–536 to comparator 416. The selected codes 531–533 are three-bit codes that represent a translation of the eight-bit servo codes. Comparator 416 generates detected code 359 and weighted value signal 759 as described above.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of operating servo circuitry that is configured to operate with a magnetic disk drive system, the method comprising:

receiving samples that include servo data;

performing a first comparison of the samples to a plurality of servo codes;

selecting a first one of the plurality of servo codes based on the first comparison and indicating the first one of the plurality of servo codes as a first selected code;

performing a second comparison of a first shifted version of the samples to the plurality of servo codes;

selecting a second one of the plurality of servo codes based on the second comparison and indicating the second one of the plurality of servo codes as a second selected code;

performing a third comparison of the selected codes; and selecting one of the selected codes based on the third comparison, wherein the one of the selected codes represents the servo data.

2. The method of claim 1 further comprising shifting the samples by one bit to generate the first shifted version of the samples.

3. The method of claim 1 further comprising:

performing the first comparison using a matched filter system to generate a plurality of weighted values; and selecting the first one of the plurality of servo codes based on the plurality of weighted values.

4. The method of claim 1 further comprising:

delaying the samples by one bit to generate the first shifted version of the samples;

performing the second comparison using a matched filter system to generate a plurality of weighted values; and selecting the second one of the plurality of servo codes based on the plurality of weighted values.

5. The method of claim 1 wherein the third comparison comprises comparing weighted values associated with the selected codes.

6. The method of claim 1 wherein the plurality of servo codes comprise Error Correcting Grey Codes (ECGC).

7. The method of claim 1 further comprising adding pairs of the samples before performing the first comparison and the second comparison.

8. The method of claim 1 further comprising:

performing a fourth comparison of a second shifted version of the samples to the plurality of servo codes; and selecting a third one of the plurality of servo codes based on the fourth comparison and indicating the third one of the plurality of servo codes as a third selected code.

9. The method of claim 8 further comprising shifting the samples by two bits to generate the second shifted version of the samples.

10. The method of claim 8 further comprising:

delaying the samples by two bits to generate the second shifted version of the samples;

performing the fourth comparison using a matched filter system to generate a plurality of weighted values; and selecting the third one of the plurality of servo codes based on the plurality of weighted values.

11. Servo circuitry that is configured to operate with a magnetic disk drive system, comprising:

a first servo detector system configured to receive samples that include servo data, perform a first comparison of the samples to a plurality of servo codes, select a first one of the plurality of servo codes based on the first comparison, indicate the first one of the plurality of servo codes as a first selected code, and transfer the first selected code;

a second servo detector system configured to receive the samples, perform a second comparison of a first shifted version of the samples to the plurality of servo codes, select a second one of the plurality of servo codes based on the second comparison, indicate the second one of the plurality of servo codes as a second selected code, and transfer the second selected code; and a first comparator coupled to the first servo detector system and the second servo detector system and configured to receive the first selected code and the second selected code, perform a third comparison of the selected codes, and select one of the selected codes based on the third comparison, wherein the one of the selected codes represents the servo data.

12. The servo circuitry of claim 11 wherein the second servo detector system is further configured to shift the samples by one bit to generate the first shifted version of the samples.

13. The servo circuitry of claim 11 wherein the first servo detector system comprises:

a matched filter system configured to receive the samples, perform the first comparison to generate a plurality of weighted values, and transfer the plurality of weighted values; and a second comparator coupled to the matched filter system and the first comparator and configured to receive the plurality of weighted values, select the first one of the plurality of servo codes based on the plurality of weighted values, indicate the first one of the plurality of servo codes as the first selected code, and transfer the first selected code to the first comparator.

14. The servo circuitry of claim 11 wherein the second servo detector system comprises:

a delay configured to receive the samples, delay the samples by one bit to generate the first shifted version of the samples, and transfer the first shifted version;

a matched filter system coupled to the delay and configured to receive the first shifted version, perform the second comparison to generate a plurality of weighted values, and transfer the plurality of weighted values; and a third comparator coupled to the matched filter system and the first comparator and configured to receive the plurality of weighted values, select the second one of the plurality of servo codes based on the plurality of weighted values, indicate the second one of the plurality of servo codes as the second selected code, and transfer the second selected code to the first comparator.

15. The servo circuitry of claim 11 wherein first comparator is further configured to perform the third comparison by comparing weighted values associated with the selected codes.

16. The servo circuitry of claim 11 wherein the plurality of servo codes comprise Error Correcting Grey Codes (ECGC).

17. The servo circuitry of claim 11 further comprising an adding system coupled to the first servo detector system and the second servo detector system and configured to add pairs of the samples to generate added samples and transfer the added samples to the first servo detector system and the second servo detector system.

18. The servo circuitry of claim 11 further comprising a third servo detector system coupled to the first comparator and configured to receive the samples, perform a fourth comparison of a second shifted version of the samples to the plurality of servo codes, select a third one of the plurality of servo codes based on the fourth comparison, indicate the third one of the plurality of servo codes as a third selected code, and transfer the third selected code to the first comparator.

19. The servo circuitry of claim 18 wherein the third servo detector system is further configured to shift the samples by two bits to generate second shifted version of the samples.

20. The servo circuitry of claim 18 wherein the third servo detector system comprises:

a delay configured to receive the samples, delay the samples by two bits to generate the second shifted version of the samples, and transfer the second shifted version;

a matched filter system coupled to the delay and configured to receive the second shifted version, perform the fourth comparison to generate a plurality of weighted values, and transfer the plurality of weighted values; and a fourth comparator coupled to the matched filter system and the first comparator and configured to receive the plurality of weighted values, select the third one of the plurality of servo codes based on the plurality of weighted values, indicate the third one of the plurality of servo codes as the third selected code, and transfer the third selected code to the first comparator.

21. A method of operating servo circuitry that is configured to operate with a magnetic disk drive system, the method comprising:

receiving samples that include servo data;

performing a first comparison of the samples to a plurality of first servo codes;

selecting one of the plurality of first servo codes based on the first comparison and indicating the one of the plurality of first servo codes as a first selected code;

performing a second comparison of the samples to a plurality of second servo codes wherein the second servo codes comprise a first shifted version of the first servo codes;

selecting one of the plurality of second servo codes based on the second comparison and indicating the one of the plurality of second servo codes as a second selected code;

performing a third comparison of the selected codes; and selecting one of the selected codes based on the third comparison, wherein the one of the selected codes represents the servo data.

22. The method of claim 21 wherein the second servo codes comprise the first servo codes shifted by one bit.

23. The method of claim 21 further comprising:
performing the first comparison using a matched filter system to generate a plurality of weighted values; and
selecting the one of the plurality of first servo codes based on the plurality of weighted values.

24. The method of claim 21 further comprising:
performing the second comparison using a matched filter system to generate a plurality of weighted values; and
selecting the one of the plurality of second servo codes based on the plurality of weighted values.

25. The method of claim 21 wherein the third comparison comprises comparing weighted values associated with the selected codes.

26. The method of claim 21 wherein the plurality of first servo codes and the plurality of second servo codes comprise Error Correcting Grey Codes (ECGC).

27. The method of claim 21 further comprising adding pairs of the samples before performing the first comparison and the second comparison.

28. The method of claim 21 further comprising:
performing a fourth comparison of the samples to a plurality of third servo codes wherein the third servo codes comprise a second shifted version of the first servo codes; and
selecting one of the plurality of third servo codes based on the fourth comparison and indicating the one of the plurality of third servo codes as a third selected code.

29. The method of claim 28 further comprising:
performing the fourth comparison using a matched filter system to generate a plurality of weighted values; and
selecting the one of the plurality of third servo codes based on the plurality of weighted values.

30. Servo circuitry that is configured to operate with a magnetic disk drive system, comprising:
a first servo detector system configured to receive samples that include servo data, perform a first comparison of the samples to a plurality of first servo codes, select one of the plurality of first servo codes based on the first comparison, indicate the one of the plurality of first servo codes as a first selected code, and transfer the first selected code;
a second servo detector system configured to receive the samples, perform a second comparison of the samples to a plurality of second servo codes wherein the second servo codes comprise a shifted version of the first servo codes, select one of the plurality of second servo codes based on the second comparison, indicate the one of the plurality of second servo codes as a second selected code, and transfer the second selected code; and
a first comparator coupled to the first servo detector system and the second servo detector system and configured to receive the first selected code and the second selected code, perform a third comparison of the selected codes, and select one of the selected codes based on the third comparison, wherein the one of the selected codes represents the servo data.

31. The servo circuitry of claim 30 wherein the second servo codes comprise the first servo codes shifted by one bit.

32. The servo circuitry of claim 30 wherein the first servo detector system comprises:

a matched filter system configured to receive the samples, perform the first comparison to generate a plurality of weighted values, and transfer the plurality of weighted values; and
a second comparator coupled to the matched filter system and the first comparator and configured to receive the plurality of weighted values, select the one of the plurality of first servo codes based on the plurality of weighted values, indicate the one of the plurality of first servo codes as the first selected code, and transfer the first selected code to the first comparator.

33. The servo circuitry of claim 30 wherein the second servo detector system comprises:
a matched filter system configured to receive the samples, perform the second comparison to generate a plurality of weighted values, and transfer the plurality of weighted values; and
a third comparator coupled to the matched filter system and the first comparator and configured to receive the plurality of weighted values, select the one of the plurality of second servo codes based on the plurality of weighted values, indicate the one of the plurality of second servo codes as the second selected code, and transfer the second selected code to the first comparator.

34. The servo circuitry of claim 30 wherein first comparator is further configured to perform the third comparison by comparing weighted values associated with the selected codes.

35. The servo circuitry of claim 30 wherein the first servo codes and the second servo codes comprise Error Correcting Grey Codes (ECGC).

36. The servo circuitry of claim 30 further comprising an adding system coupled to the first servo detector system and the second servo detector system and configured to add pairs of the samples to generate added samples and transfer the added samples to the first servo detector system and the second servo detector system.

37. The servo circuitry of claim 30 further comprising a third servo detector system coupled to the first comparator and configured to receive the samples, perform a fourth comparison of the samples to a plurality of third servo codes, select one of the plurality of third servo codes based on the fourth comparison, indicate the one of the plurality of third servo codes as a third selected code, and transfer the third selected code.

38. The servo circuitry of claim 37 wherein the third servo detector system comprises:
a matched filter system configured to receive the samples, perform the fourth comparison to generate a plurality of weighted values, and transfer the plurality of weighted values; and
a fourth comparator coupled to the matched filter system and the first comparator and configured to receive the plurality of weighted values, select the one of the plurality of third servo codes based on the plurality of weighted values, indicate the one of the plurality of third servo codes as the third selected code, and transfer the third selected code to the first comparator.

* * * * *